(12) United States Patent
Vandermeijden

(10) Patent No.: US 6,804,524 B1
(45) Date of Patent: Oct. 12, 2004

(54) SYSTEM AND METHOD FOR THE ACQUISITION OF AUTOMOBILE TRAFFIC DATA THROUGH WIRELESS NETWORKS

(75) Inventor: Tom R. Vandermeijden, Pacifica, CA (US)

(73) Assignee: Openwave Systems Inc., Redwood City, CA (US)

(*) Notice: Subject to any disclaimer, the term of this patent is extended or adjusted under 35 U.S.C. 154(b) by 496 days.

(21) Appl. No.: 09/718,970

(22) Filed: Nov. 21, 2000

(51) Int. Cl.[7] ............................................. H04Q 7/20
(52) U.S. Cl. ........................ 455/456.1; 455/414.1; 455/414.2; 455/456.2; 455/440; 455/441; 701/117; 701/118; 701/119; 340/988; 340/992; 342/450; 342/454; 342/456
(58) Field of Search ................ 455/414.1, 414.2, 455/414.3, 432.1, 456.1, 456.2, 422, 440, 441; 701/117–119, 208, 209, 210, 213; 340/988, 990, 992; 342/454, 450, 456, 457

(56) References Cited

U.S. PATENT DOCUMENTS

| | | | | |
|---|---|---|---|---|
| 5,289,183 A | * | 2/1994 | Hassett et al. ............... 340/905 |
| 5,345,598 A | * | 9/1994 | Dent ........................... 455/522 |
| 5,539,398 A | * | 7/1996 | Hall et al. ................... 340/907 |
| 5,812,069 A | * | 9/1998 | Albrecht et al. ............ 340/905 |
| 5,818,356 A | * | 10/1998 | Schuessler ............. 340/995.12 |
| 5,933,100 A | * | 8/1999 | Golding ................. 340/995.13 |
| 5,948,042 A | | 9/1999 | Heimann et al. |
| 6,092,020 A | * | 7/2000 | Fastenrath et al. .......... 701/119 |
| 6,236,933 B1 | * | 5/2001 | Lang .......................... 701/117 |
| 6,282,427 B1 | * | 8/2001 | Larsson et al. .......... 455/456.2 |
| 6,298,302 B2 | * | 10/2001 | Walgers et al. ............. 701/209 |
| 6,317,682 B1 | * | 11/2001 | Ogura et al. ................ 701/117 |
| 6,329,932 B1 | * | 12/2001 | Fastenrath ................. 340/934 |
| 6,466,862 B1 | * | 10/2002 | DeKock et al. ............. 701/117 |
| 6,522,875 B1 | * | 2/2003 | Dowling et al. ......... 455/414.3 |

FOREIGN PATENT DOCUMENTS

WO    WO 99/24952    5/1999

\* cited by examiner

*Primary Examiner*—Bill Trust
*Assistant Examiner*—Stephen M D'Agosta
(74) *Attorney, Agent, or Firm*—Blakely, Sokoloff, Taylor & Zafman LLP (57) ABSTRACT

A system and method is disclosed for the acquisition of automobile traffic information through wireless data networks. In one embodiment, the method determines traffic conditions on roadways using a plurality of mobile communication devices. Traffic data is obtained from the mobile communication devices. The traffic data is provided to the server. The traffic data is analyzed to determine the traffic conditions.

18 Claims, 6 Drawing Sheets

| Region 1100 | 1101 | 1102 |
|---|---|---|
| $C_T = 12$ $T_g = 15$ | $C_T = 11$ $T_g = 10$ | $C_T = 7$ $T_g = 10$ |
| 1200 | 1201 | 1202 |
| $C_T = 2$ $T_g = 5$ | $C_T = 8$ $T_g = 5$ | $C_T = 9$ $T_g = 5$ |
| 1300 | 1301 | 1302 |
| $C_T = 4$ $T_g = 5$ | $C_T = 7$ $T_g = 5$ | $C_T = 1$ $T_g = 5$ |

*FIG. 6*

SYSTEM AND METHOD FOR THE ACQUISITION OF AUTOMOBILE TRAFFIC DATA THROUGH WIRELESS NETWORKS

BACKGROUND OF THE INVENTION

1. Field of the Invention

This invention relates generally to the field of wireless communication networks. More particularly, the invention relates to a system and method for the acquisition of automobile traffic information through wireless data networks.

2. Description of the Related Art

Much of the world population travels via automobile on highways and roads. Often, drivers and passengers spend hours in traffic because of congestion, accidents, and other similar traffic conditions. Drivers have very limited information regarding street traffic conditions on which to base their route to minimize travel time. Traffic reports and similar broadcast information are typically available for a few spots along major routes, and not all roads. Typical sources for these reports include traffic cameras at fixed locations, traffic helicopters, road sensors, and the police. Similarly, broadcast reports are not available readily, but only at certain times of the day.

Most travelers may take multiple routes to reach the same destination. At various points along the way, the driver can decide to take an alternate route. However, once in the automobile, the driver has very limited information about traffic conditions ahead and can not consistently make the best decision to minimize travel time (or even to know after-the-fact whether the route taken was the best possible route).

SUMMARY OF THE INVENTION

A system and method is disclosed for the acquisition of automobile traffic through wireless data networks. In one embodiment, the method determines traffic conditions on roadways using a plurality of mobile communication devices. Traffic data is obtained from the mobile communication device. The traffic data is provided to the server. The traffic data is analyzed to determine the traffic conditions.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION OF PREFERRED EMBODIMENTS

A system and method is disclosed for the acquisition of automobile traffic through wireless data networks. In one embodiment, the method determines traffic conditions on roadways using a plurality of mobile communication devices. Traffic data is obtained from the mobile communication device. The traffic data is provided to the server. The traffic data is analyzed to determine the traffic conditions.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to automobile motion data. However, the same techniques can easily be applied to other types of mobile communications transmission data.

The present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

An Exemplary Network Architecture

Figure 1:
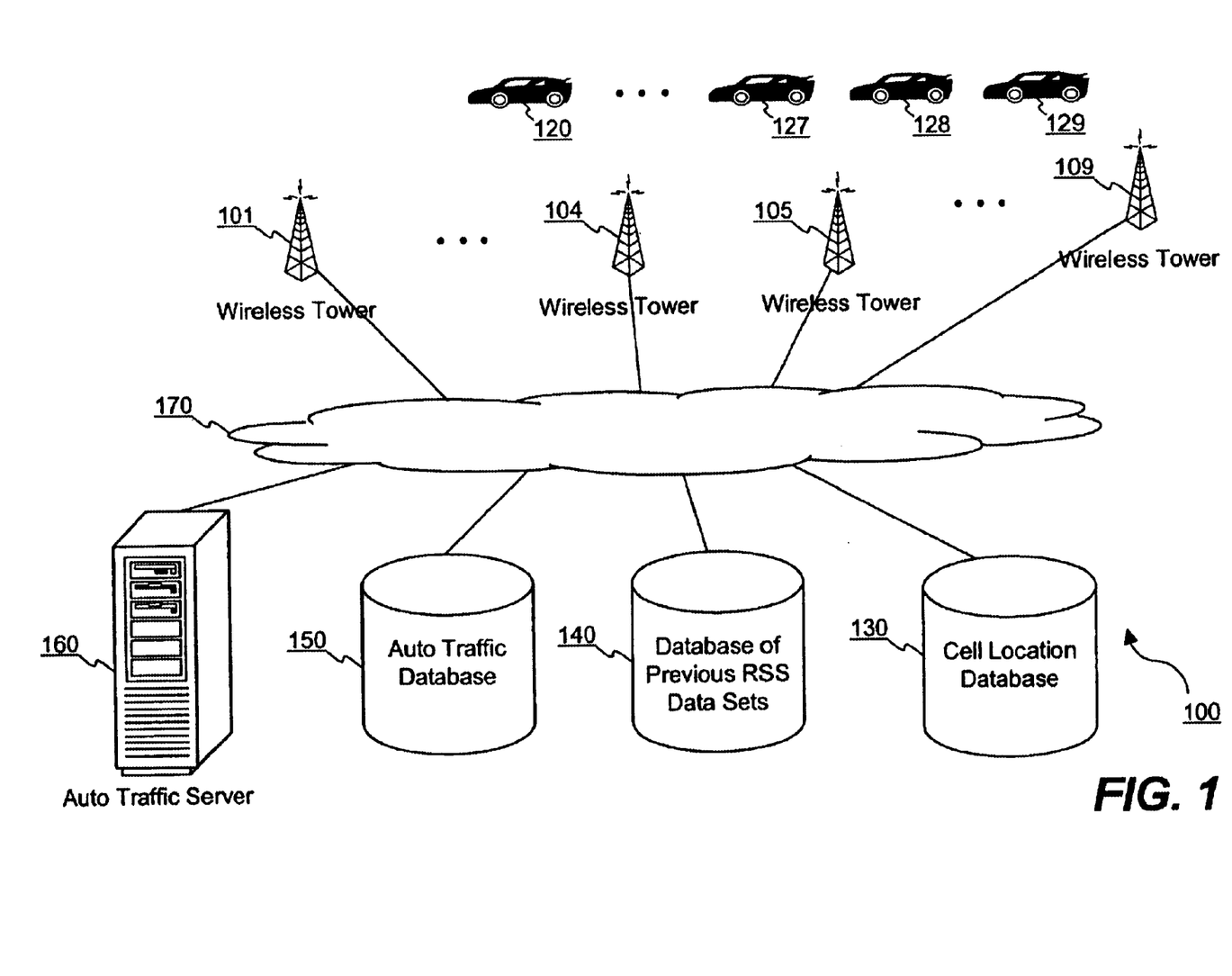
FIG. 1 illustrates a block diagram of an exemplary system for the efficient acquisition of automobile traffic data through wireless networks.

Elements of the present invention may be included within an automobile traffic measurement system 100 such as that illustrated in FIG. 1. FIG. 1 illustrates a block diagram of an exemplary system for the efficient acquisition of automobile motion data through wireless networks. According to the embodiment depicted in FIG. 1, one or more automobiles 120–129 are travelling in proximity to wireless communication towers 101–109.

Wireless communication towers 101–109 transmit and receive data to and from mobile communication devices. Within some or all automobiles 120–129 are these mobile communication devices, such as, cellular telephones, two-way radios, or two-way pagers (e.g., in which the necessary transaction software is electronic in a microchip). Mobile communication devices such as global positioning satellite systems may also be carried within automobiles 120–129, as well as, mobile personal computers and handheld computing devices. In one embodiment, the mobile device is a cellular telephone with an intelligent browser which communicates digitally over a wireless network to a traffic server using the radio hardware and infrastructure of the cellular service provider (e.g. SprintPCS™, AT&T™, etc . . . ).

In one embodiment, mobile communication devices may transmit and receive data from automobile traffic server 160 over a variety of communication networks 170 including (but not limited to) a local area network (LAN) and/or a larger network (e.g., the Internet). Alternative communication channels such as wireless communication via satellite broadcast (not shown) are also contemplated within the scope of the present invention.

In general, the wired network side architecture of the present invention can be implemented as a standard telephone connection provided through an Internet service provider to enable data communication on the Internet over a conventional telephone network. This use of the Internet as a distribution network is well known to those of ordinary skill in the art. In an alternate embodiment having cable modem capability, communication over a conventional cable network is possible in lieu of communication over the telephone network. The cable network is typically much faster (i.e. provides a much greater bandwidth) than the standard telephone network; however, cable modems are typically more expensive than standard POTS (plain old telephone system) modems. In another alternate embodiment having conventional Integrated Services Digital Network (ISDN) capability, the network 170 is accessed using an ISDN modem. Again, the ISDN network is typically faster than the POTS network; however, access to an ISDN network is generally more expensive. Cable modems and ISDN implementations are alternative communications media to the POTS implementation.

The wireless architecture of the present invention may be implemented using numerous types of networks. Examples of wireless networks upon within which the present invention may be implemented are Global System for Mobile Communications (GSM), Code Division Multiple Access (CDMA), Time Division Multiple Access (TDMA), Cellular Digital Packet Data (CDPD), Integrated Digital Enhanced Network (iDEN), etc.

Automobile traffic server 160 receives output data from mobile communication devices, and generates automobile speed and congestion data. A database of mobile devices and their associated locations and velocity vectors is provided. Traffic server 160 is connected to network 170.

Automobile traffic measurement system 100 also includes cell location database 130. Cell location database 130 stores information regarding the last known location of a mobile wireless device that is in system 100. Contour maps of signal strength surrounding each wireless communication tower 101–109, as well as, the physical location of each wireless communication tower 101–109 are also stored in cell location database 130. Cell location database is connected to network 170.

A database of previous relative signal strength (RSS) sets 140 is also connected to network 170. Although described with respect to RSS, other signal characteristics that measure distance to the cellular tower may be used, such as signal delay, global positioning satellites (GPS) or combinations of these characteristics. Database 140 stores data provided by mobile communication devices, such as the RSS of nearby wireless towers 101–109, the unique wireless tower 101–109 identifier, the unique mobile device identifier, and a time stamp. In addition, the database 140 stores the previous physical location of each mobile device in system 100. The previous physical location of a mobile device is then used to calculate the current velocity vector of the same mobile device. To conserve memory and prevent the use of stale data, database 140 may be periodically purged, and the memory space may then be made available for reuse. In one embodiment, the database 140 may expire internal data after a time period of one hour.

Also included in system 100 is automobile traffic database 150. Automobile traffic database 150 stores a "data" set output by each mobile device of system 100 in real time. This output data set may include, a mobile device identifier, a time stamp or, velocity vectors. In addition it may include longitudinal and latitudinal position vectors obtained from a GPS receiver within the mobile device. The output data set may include interpolated values from raw data, such as RSS values. From this data, a geographic location of the mobile communication device may be mapped to a street map using GPS technology, in one embodiment. In addition system 100 may count the number of mobile devices passing a wireless tower during a certain time period. System 100 may be divided into multiple systems where each system covers a small service area. Each service area could be several hundred or several thousand square miles.

Device specific parameters, including RSS values, may be obtained by server 160 from a mobile communication device. These RSS values may be obtained from the communication device and then stored in RSS database 140. Although the following description uses RSS data for calculating velocity vectors of automobile traffic, analogous forms of data are also contemplated to be within the scope of the present invention. In one embodiment, the mobile communication device is equipped with a Web browser as described above. Device specific parameters stored as objects within the mobile communication device may be read by invoking device layer Application Program Interfaces (APIs). For example, an API may be used to obtain the RSS of wireless towers 101–109. Another API may be used to obtain a cell identifier. Other readable objects include lattitude, longitude, and altitude positioning, especially with mobile communication devices equipped with Global Positioning Satellite (GPS) systems. The APIs described herein are generally available on Web enabled mobile communication devices. Extensive modification to the mobile device is typically not necessary to call the APIs described, and is well within the capabilities of one of ordinary skill in the art. For example, the RSS values may be obtained from the handset using a programming script, such as that described below.

In another embodiment, the server 160 obtains desired device specific parameters by submitting an Extensible Markup Language (XML) page to the Web browser running on the mobile communication device. The Web browser executes instructions included on the XML page, for example reading objects that describe RSS values. The Web browser then sends back to server 160 the information requested on the XML page. In alternate embodiments, the information may be extracted from the mobile communication device using Wireless Markup Language (WML), or Hyper Text Markup Language (HTML) calls.

Automobile traffic server 160 may internally store various types of data. This may include, for example, specific client data (e.g., client account information and client preferences) and/or more general data. The databases of system 100 in one embodiment run an instance of a Relational Database Management System (RDBMS), such as Microsoft™ SQL-Server, Oracle™ or the like. Although illustrated in FIG. 1 as separate databases, the data and functionality of databases 130–150 may be combined within a single database, as well.

A mobile communication device may interact with and receive feedback from an automobile traffic server 160 using various different communication devices and/or protocols, for example Wireless Application Protocol (WAP). According to one embodiment, a mobile communication device connects to automobile traffic server 160 via client software. The client software may include a browser application such as a WAP MicroBrowser in a cellular telephone, or Netscape Navigator™ or Microsoft Internet Explorer™ on a personal computer which communicates to automobile traffic server 160 via the Hypertext Transport Protocol (hereinafter "HTTP").

Note that any or all of the components of the system illustrated in FIG. 1 and associated hardware may be used in various embodiments of the present invention; however, it will be appreciated by those of ordinary skill in the art that other configurations of the system may be used within the spirit and scope of the present inventive method and system.

A Computer Architecture

Figure 2:
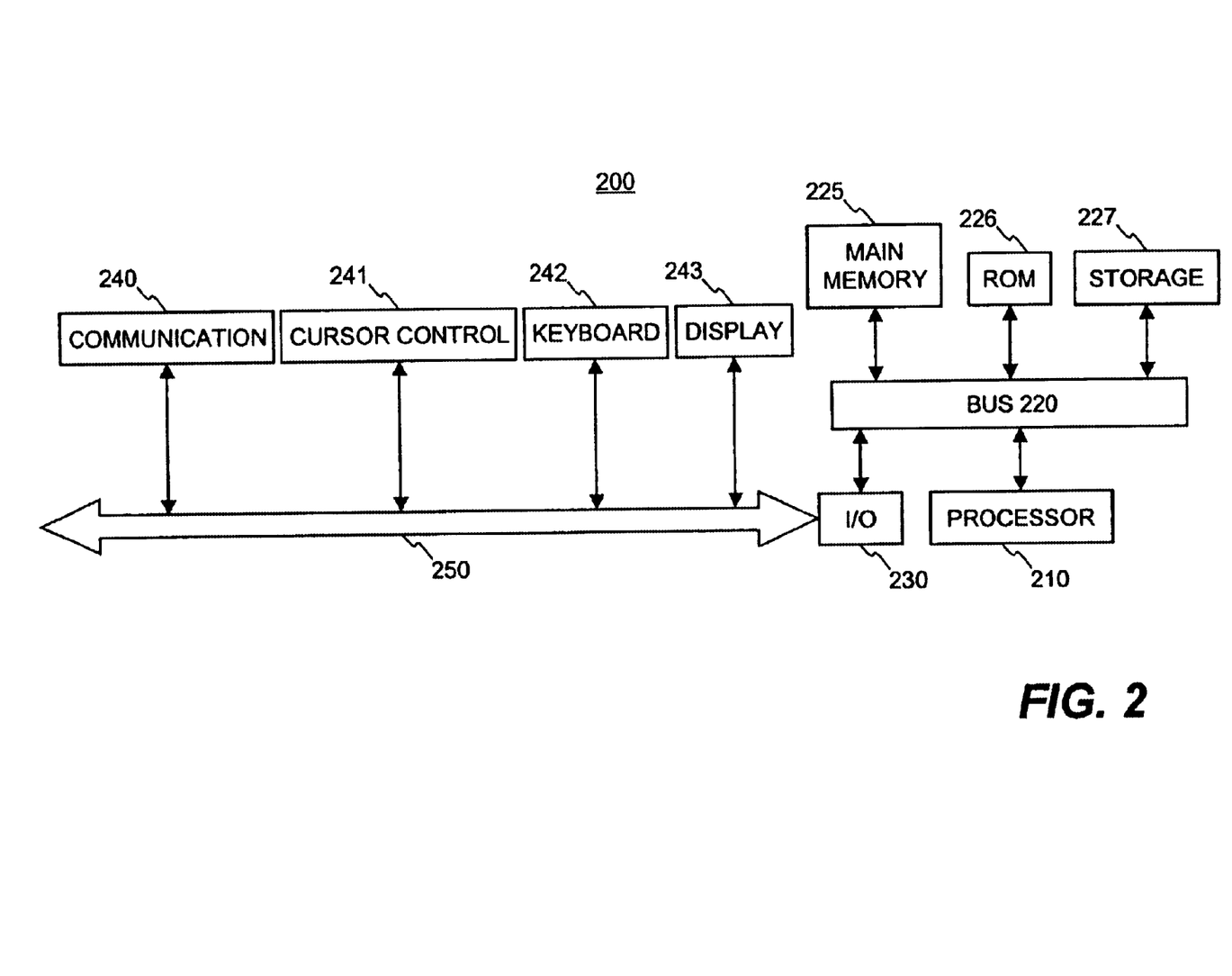
FIG. 2 illustrates an exemplary computer architecture used to implement elements of the invention.

Having briefly described an exemplary network architecture which employs various elements of the present invention, a computer system 200 in which elements of the present invention may be implemented will now be described with reference to FIG. 2. Computer system 200 may be implemented within the mobile communication devices and within traffic server 160 of FIG. 1. System 200 may be used to provide raw data between the mobile devices and traffic server 160.

One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via an I/O interface 230. A plurality of I/O devices may be coupled to I/O bus 250, including a display device 243, an input device (e.g., an alphanumeric input device 242 and/or a pointing device 241). For example, video news clips and related information may be presented to the user on the display device 243.

The communication device 240 is for accessing other computers (servers or clients) via a network 170. The communication device 240 may comprise a modem, a network interface card, or other well-known interface device, such as those used for coupling to Ethernet, token ring, or other types of networks.

Figure 3:
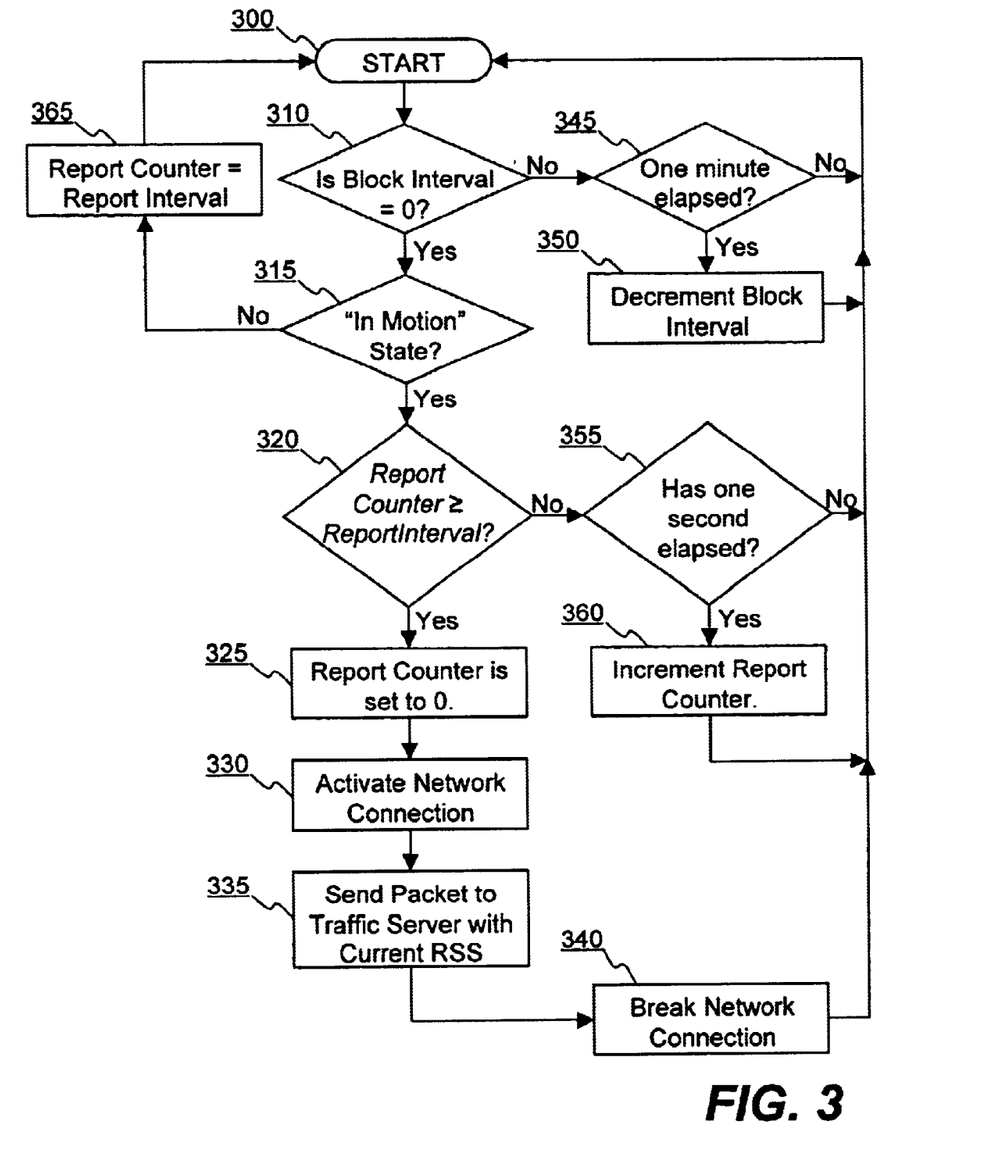
FIG. 3 illustrates a diagram of an exemplary flow control for updating traffic server 160 with raw data from mobile devices of system 100.

FIG. 3 illustrates a diagram of an exemplary flow control for updating traffic server 160 with raw data from mobile devices of system 100. In one embodiment, the flow described in conjunction with FIG. 3 occurs within the mobile communication devices of system 100. For each mobile device in system 100, the process begins at block 300. At decision block 310, the mobile device determines if the block interval variable is equal to 0. The block interval is set to 0 by traffic server 160 to stop or postpone a mobile device from transmitting raw motion data for a certain time period. In one embodiment, the block interval could be 60 minutes. A block interval of 60 minutes would indicate that the traffic server 160 will not receive raw motion data from the mobile device for 60 minutes.

If the block interval does not equal 0, then the mobile device determines if one minute has elapsed since the question was last answered "yes." If one minute has not elapsed, then flow returns to start block 300, through decision block 310, where the block interval will not be equal to 0 again and control flows to decision block 345 again. If one minute has elapsed, then flow continues to processing block 350 where the block interval is decremented. In alternate embodiments, decision block 345 may require any time period to elapse, such as 5, 10, or 15 minutes. Flow returns to start block 300 and then to decision block 310.

If the block interval is equal to 0 in block 310, then the traffic server 160 indicates that the mobile device may begin providing raw motion data to the traffic server 160. Flow continues to decision block 315 in which the system 100 determines if the mobile device is "in motion." A positive determination that the mobile device is "in motion" signifies that the raw motion data is useful and reliable. This test for qualitative motion is described below with FIG. 4. The motion test interpolates a velocity vector associated with a particular mobile device based upon RSS data provided by that mobile device. The RSS data may be obtained from the handset as described above. By analyzing the interpolated velocity vector, the traffic server 160 may determine if the raw motion data from a particular mobile device is useful and reliable. For example, if the mobile device is moving between 10 and 50 miles per hour, then there is a high probability that the mobile device is in a moving automobile and not located on a pedestrian or bicyclist whose motion data would be useless. If the mobile device is not in motion (e.g. in a moving automobile), the mobile device will not transmit raw motion data to traffic server 160 and flow continues processing block 365.

At processing block 365, a report counter variable is set equal to the report interval of approximately one minute for the mobile device such that the mobile device immediately begins reporting once it goes "in motion." The report interval is set on the server side. Flow control passes back to start block 300.

If the mobile device is in a state of motion, flow control passes to decision block 320. In decision block 320, the report counter is compared to the report interval. The report interval is a variable received from the traffic server 160 that indicates the frequency of updates the traffic server 160 wishes to receive from the mobile device. (e.g. once ever minute, once every ten minutes, etc . . . ) If the report counter is not greater than or equal to the report interval, then flow passes to decision block 355. At decision block 355, system 100 determines if one second has elapsed since block 355 was last answered "yes." If one second has not elapsed, then flow passes back to start block 300. If one second has elapsed, then the report counter is incremented in processing block 360. Flow then passes back to start block 300.

If the report counter is greater than or equal to the report interval, then system 100 will update the physical location of the mobile device and flow passes to processing block 325. At processing block 325, the report counter is reset to 0. Flow continues to processing block 330 where the network connection is activated between the mobile device and traffic server 160. At processing block 335 a data packet is sent from the mobile device to the traffic server 160 containing the current RSS value at a wireless tower 101–109. For example, if a mobile device were to drive by wireless tower 101, the mobile device can measure the RSS of tower 101 (e.g. whether it is increasing or decreasing). The wireless tower identifier is also provided to the traffic server 160. The network connection is broken at processing block 340 and the process repeats from start block 300. Thus, if a particular mobile device tests positively that it is in motion, it reports to the traffic server 160 while all stationary or other mobile devices (i.e. mobile devices that do not test positively for being in motion) remain off the air.

In one embodiment, the system 100 is an intelligent network that shares voice and traffic reporting modes. However, priority is placed on carrying voice over system 100. For example, system 100 does not deluge the network with motion data and prevent voice data from being communicated across the network. Instead, system 100, only accepts traffic data that is useful and reliable, thus creating a minimal data set for analysis. Furthermore, if the bandwidth of system 100 is saturated with voice, the traffic-reporting mode may not be available to users until some of the bandwidth is released from voice traffic.

Figure 4:
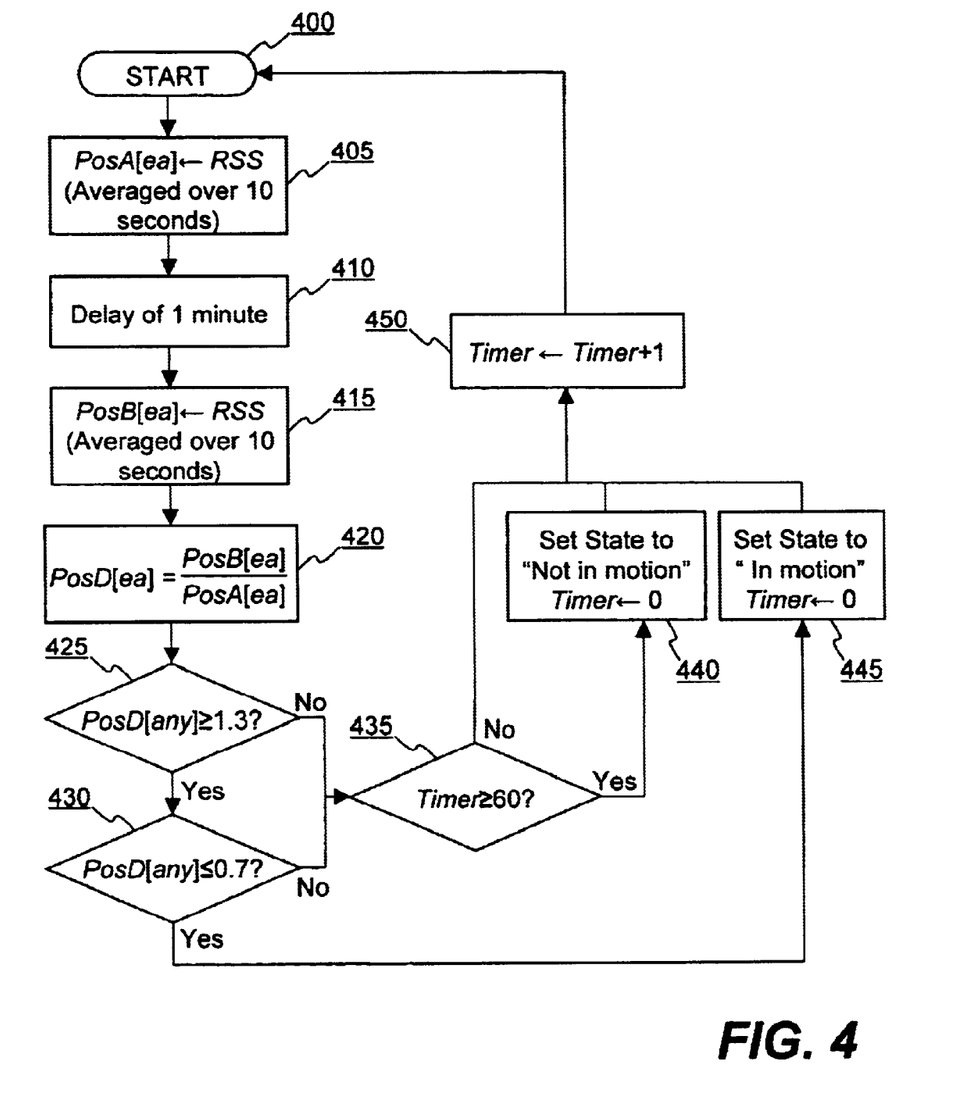
FIG. 4 illustrates an exemplary mobile device side flow diagram of the test for qualitative motion.

FIG. 4 illustrates an exemplary flow diagram of the test for qualitative motion performed in decision block 315 of FIG. 3. The following process, executed within the mobile device, may be used to determine if the mobile device is travelling at speeds sufficient to render the raw motion data useful (i.e. automotive speeds). The result of the process of FIG. 4 is to determine that the mobile device is in one of three states: in motion, not in motion, or inconclusive. If the result is "inconclusive" the process defaults to its previous state. Flow starts at block 400.

In processing block 405, for each reporting mobile device, its average RSS over a 10 second period (or other reasonable period of time) is stored within variable array PosA[ea]. PosA[ea], although an array of RSS values, also signifies a first position of the reporting mobile device because signal strength indicates a position of the mobile device relative to the wireless towers that changes over time if the mobile device is in motion. Because of the multiple RSS values associated with each and every wireless tower 101–109 that is in the range of the mobile device, PosA[ea] is structured as an array. Although described as averaged over 10 seconds, in alternate embodiments, the RSS may be averaged over any reasonable length of time that results in an increase in the probability of receiving reliable and useful RSS data. Furthermore, the averaging process may be used to stabilize the short term effects of fluctuations in RSS data.

Flow continues to processing block 410 where a delay of one minute or other suitable measure is introduced into the process. A suitable measure is a delay sufficient for sampling and determining adequate motion of a handheld device. Over this suitable measure of time, the mobile device has moved a certain distance from its first position that allows system 100 to interpolate velocity information regarding that particular mobile device. Flow continues to processing block 415

In processing block 415, the average RSS over another 10 second period (or other reasonable period of time) is stored within variable array PosB[ea]. Although PosB[ea] is an array of RSS values, PosB[ea] also signifies a new, second position of the reporting mobile device because RSS values indicate a: position of the mobile device relative to the wireless towers that changes over time when the mobile device is in motion. Because of the multiple RSS values associated with each and every wireless tower 101–109 that is in the range of the mobile device, PosB[ea] is structured as an array. Although described as averaged over 10 seconds, in alternate embodiments, the RSS values may be averaged over any reasonable length of time that provides an appropriate averaging effect. Thus, upon reaching processing block 420, two sets of data indicating RSS are stored in variables PosA[ea] and PosB[ea]. From these two sets of data, the traffic server 160 can determine if the mobile device has moved.

In processing block 420, traffic server 160 determines if the mobile device has moved. The net change in position (delta) from PosA[ea] to PosB[ea] is stored in PosD[ea]. PosD[ea] is calculated as $$\frac{PosB[ea]}{PosA[ea]}.$$

Thus, for each wireless tower 101–110 represented in the array [ea], its previous RSS value is divided by its current RSS value. In an extreme case where there is no movement (e.g. the first and second points are the same) RSS is constant and the array [ea] is equal to 1. Flow continues to decision block 425.

In decision block 425, the array PosD is searched for any value to be greater than a suitable upper threshold value. For example, a suitable upper threshold value may be 1.3, because a value equal to or greater than 1.3 indicates at least a 30% increase in RSS. The increase in RSS is a relative measurement take between the first measurement of RSS and the second measurement of RSS at the same wireless tower 101–109. This analysis serves as a reliable indication of movement towards another one of the wireless towers 101–109. In alternate embodiments, values other than 1.3 may be used, for example the value 1.4 may be used to represent a 40% increase in RSS. Each position is associated with a wireless tower 101–109.

If an element of PosD is greater than the upper threshold value, flow passes to decision block 430. In decision block 430, the array PosD is searched for any value to be less than a lower threshold value. For example, a lower threshold value may be 0.7. A value less than 0.7 indicates at least a 30% decrease in RSS between the first measurement of RSS and the second measurement of RSS at the same wireless tower 101–109. This decrease in RSS indicates movement towards another wireless tower 101–109. For example, if a mobile device moves from tower 109 to 108, PosD may indicate a 30% increase in the element of its array representing tower 108. Similarly, PosD to may indicate a 30% decrease in the element of its array representing tower 109. Thus, a mobile device's movement may be detected and a determination may be made as to whether there is sufficient motion for the data to be reliable and useful. In alternate embodiments, values other than 0.7 may be used, for example the value 0.6 may be used to represent a 40% decrease in RSS.

If an element of PosD is not greater than the upper threshold, or an element of PosD is not less than the lower threshold, flow passes to decision block 435. If the process reaches decision block 435, the system 100 determines that either the mobile device is not in motion or the data is inconclusive. In decision block 435, the traffic server 160 waits for a predetermined time period to see if the mobile communication device goes into motion. For example, the predetermined time period may be 60 minutes or other suitable time period. If less than the predetermined time period has elapsed, then the timer is incremented in processing block 450 and flow returns to start block 400. If the predetermined time period or more have elapsed without satisfying both decision blocks 425 and 430, then flow continues to processing block 440. In processing block 440, the state of the mobile device is set to "Not in Motion." The timer is reset to 0 and flow continues to processing block 450 where the timer is incremented. The process restarts at start block 400. Although the timer has been set to 60 minutes in this embodiment, any reasonable time period may be set such as 30 minutes or 90 minutes.

If an element of PosD is greater than the upper threshold, or an element of PosD is less than the lower threshold, flow passes from decision block 430 to processing block 445. If the process reaches processing block 435, the traffic server 160 determines that the mobile device is "in motion." The timer is reset to 0 and flow continues to processing block 450 where the timer is incremented. The process restarts at start block 400.

In one embodiment, system 100 has the ability to accept raw motion data from a limited number of mobile devices until a predetermined sample size is met. Even if more mobile devices are available to provide motion data, the traffic server 160 may not accept them in order to avoid system congestion and acceptance of unreliable data. In another embodiment, traffic server 160 can instruct excess mobile devices to stop reporting for a certain amount of time, whether it is minutes, hours, or days.

In one embodiment, the traffic server 160 performs numerous functions. For example, traffic server 160 accepts RSS values and returns the exact geographic location of the mobile device. It calculates the velocity of the mobile device and maps the geographic location to a street map. The traffic server 160 assigns direction and velocity to the mobile device and counts the number of mobile devices passing a point during a certain time period.

Figure 5:
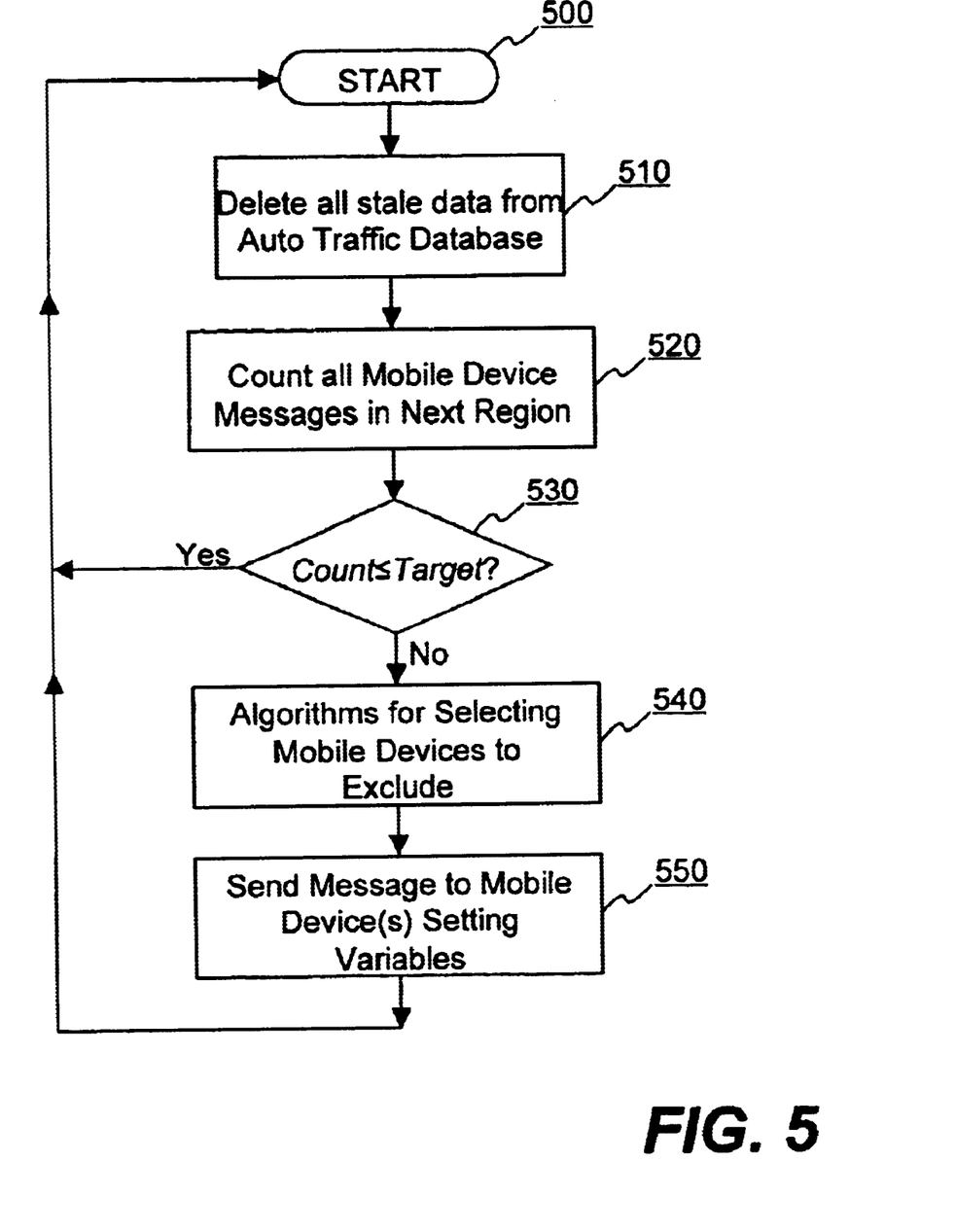
FIG. 5 illustrates an exemplary server side process for traffic server 160.

FIG. 5 illustrates an exemplary server side process for traffic server 160. The process begins in start block 500. At processing block 510, all "stale" data is deleted from automobile traffic database 150. The memory is made available for reuse. In one embodiment, stale data is data that has been stored in database 150 greater than 20 minutes.

Flow continues to processing block 520, where traffic server 160 scans the traffic database 150 and counts number of mobile devices registered in a predetermined geographic region. At decision block 530, the total number of registered mobile devices is compared against a target value representing the maximum number of registered mobile device allowed by traffic server 160 for that specific region. In one embodiment, the mobile device service provider sets the "target" value, and may reduce it, in real time, as demand on the wireless network from voice and other data services approaches the capacity of system 100. If the total number of registered devices has not exceeded the "target", then the process starts again at start block 500. If the total number of registered devices exceeds the "target" value, then too many mobile devices are reporting to traffic server 160 or the mobile devices are reporting too frequently, and flow continues to processing block 540.

At processing block 540, traffic server 160 implements a process for reducing the incoming flow of data. In one embodiment, a random selection of mobile devices are excluded from reporting until the count is less than the "target." This may be accomplished by adjusting the report interval. In another embodiment, mobile devices that are likely to leave its current geographic location for another location, have a smaller report interval, thus allowing, mobile devices to be reactivated once it reaches a new location.

Figure 6:
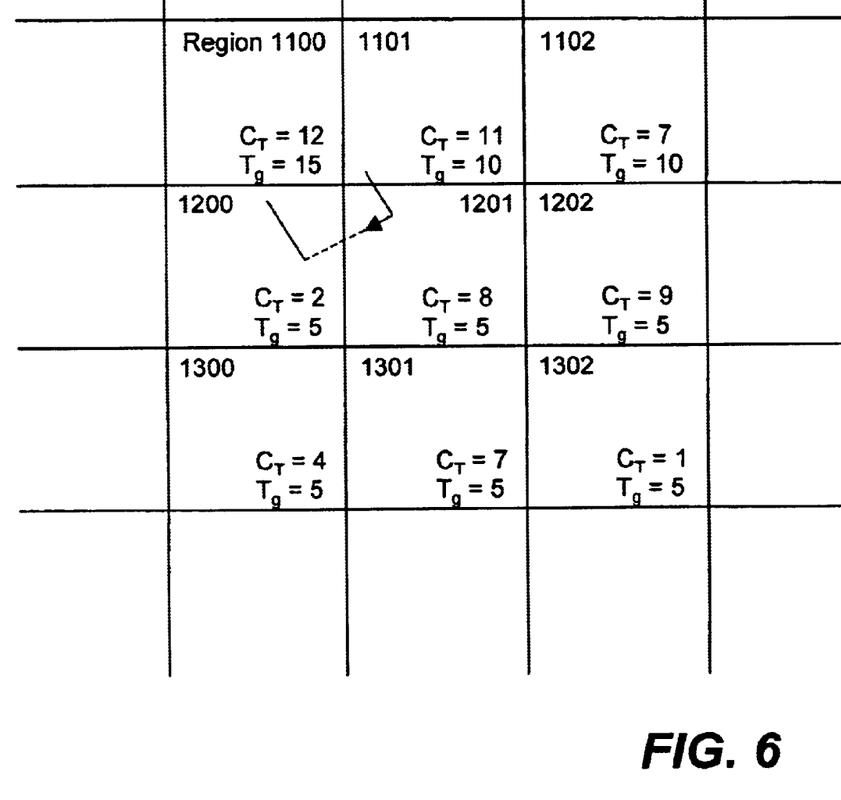
FIG. 6 illustrates a process for reducing mobile device reporting.

For example, FIG. 6 illustrates a process for reducing mobile device reporting. Nine regions are illustrated with "count" ($C_T$) and "target" ($T_g$) values indicated for each region. A count value indicates the number of reporting devices in that region. The target value indicates the number of desired reporting devices for that region. The location of a mobile device is shown in region 1201 by an X. The arrow away from the X represents its associated velocity vector. In the example shown in FIG. 6, the probability is relatively high that the mobile device will leave region 1201 and enter region 1200 where there is a shortage of reporting mobile devices. The estimated distance that the mobile device will travel to arrive at the boundary of region 1200 is D1. The estimated time to arrival at the 1200 boundary is equal to D1/velocity. The report interval for that mobile device is set to the estimated arrival time at processing block 550. Thus, once the mobile device reaches the boundary after the estimated arrival time, it may begin reporting to the traffic server. The process then starts again at block 500.

From a user's perspective, the inventive method and system operates independent of the mobile device user's input. The user simply turns on the mobile device and the mobile device initiates communications with the traffic system and commences reporting.

A system and method for the acquisition of automobile traffic data through wireless data networks is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

What is claimed is:

1. A method comprising:
   determining traffic conditions on roadways using a plurality of mobile communication devices comprising,
   obtaining traffic data from each mobile communication device of the plurality of mobile communication devices, wherein the traffic data includes a relative signal strength value;
   locating each mobile communication device;
   calculating a velocity of each mobile communication device by receiving the traffic data from each mobile communication device at a first time interval and at a second time interval;
   providing the traffic data to a web server; and
   analyzing the traffic data to determine the traffic conditions comprising,
   receiving a relative signal strength values at the web server from each mobile communication device;
   mapping with the web server, a geographic location of each mobile communication device to a street map using a database of cell locations; and
   counting a number of mobile communication devices passing a point during a certain time period.

2. The method of claim 1, wherein determining traffic patterns further comprises determining whether each mobile communication device is moving.

3. The method of claim 1, wherein determining traffic patterns further comprises obtaining location data from a global positioning satellite system.

4. A system, comprising:
   means for determining traffic conditions on roadways using a plurality of mobile communication devices comprising, means for obtaining traffic data from each mobile communication device of the plurality of mobile communication devices, wherein the traffic data includes a relative signal strength value;

means for locating each mobile communication device;

means for calculating a velocity of each mobile communication device by receiving the traffic data from each mobile communication device at a first time interval and at a second time interval;

means for providing the traffic data to a web server; and means for analyzing the traffic data to determine the traffic conditions comprising, means for receiving a relative signal strength values at the web server from each mobile communication device;

means for mapping with the web server, a geographic location of each mobile communication device to a street map using a database of cell locations; and means for counting a number of mobile communication devices passing a point during a certain time period.

5. The system of claim 4, wherein the means for determining traffic patterns further comprises means for determining whether each mobile communication device is moving.

6. The system of claim 4, wherein the means for determining traffic patterns further comprises means for obtaining location data from a global positioning satellite system.

7. A computer readable medium having stored thereon a plurality of instructions, said plurality of instructions when executed by a computer, cause said computer to perform:

determining traffic conditions on roadways using a plurality of mobile communication devices comprising, obtaining traffic data from each mobile communication device of the plurality of mobile communication devices, wherein the traffic data includes a relative signal strength value;

locating each mobile communication device;

calculating a velocity of each mobile communication device by receiving the traffic data from each mobile communication device at a first time interval and at a second time interval;

providing the traffic data to a web server; and analyzing the traffic data to determine the traffic conditions comprising, receiving a relative signal strength values at the web server from each mobile communication device;

mapping with the web server, a geographic location of each mobile communication device to a street map using a database of cell locations; and counting a number of mobile communication devices passing a point during a certain time period.

8. The computer-readable medium of claim 7 having stored thereon additional instructions, said additional instructions when executed by a computer for detaining traffic conditions, cause said computer to further perform: determining whether each mobile communication device is moving.

9. The computer-readable medium of claim 7 having stored thereon additional instructions, said additional instructions when executed by a computer for determining traffic conditions, cause said computer to further perform:

sending raw traffic data from each mobile communication devices to a traffic server.

10. A method for use with a mobile communication device, comprising:

receiving a request from a web server for traffic data; and provide the traffic data to the web server, wherein the traffic data includes relative signal strength values, location data, and quality of signal data, and wherein the web server locates the mobile communication device, calculates a velocity of the mobile communication device at a first time interval and a second time interval, maps a geographic location of the mobile device to a street map using a database of cell locations, and counts a number of mobile communication devices passing a point during a certain time period.

11. The method of claim 10, wherein receiving the request further comprises:

receiving a markup language document, wherein the document contains instructions; and executing the instructions by a Web browser running on the device.

12. The method of claim 10, wherein providing the traffic data further comprises:

generating a markup language document by a browser running on the device; and transmitting the document to the web server, wherein the document contains the traffic data.

13. A mobile communication device, comprising:

means for receiving a request from a web server for traffic data; and means for providing the traffic server the traffic data, wherein the traffic data includes relative signal strength values, location data, and quality of signal data, and wherein the web server locates the mobile communication device, calculates a velocity of the mobile communication device at a first time interval and a second time interval, maps a geographic location of the mobile device to a street map using a database of cell locations, and counts a number of mobile communication devices passing a point during a certain time period.

14. The device of claim 13 wherein the means for receiving the request further comprises:

means for receiving a markup language document, wherein the document contains instructions; and means for executing the instructions by a Web browser running on the device.

15. The method of claim 13, wherein the means for providing the traffic data further comprises:

means for generating a markup language document by a browser running on the device; and means for transmitting the document to the web server, wherein the document contains the traffic data.

16. A computer readable medium having stored thereon a plurality of instructions, said plurality of instructions when executed by a computer, cause said computer to perform:

receiving a request from a web server for traffic data; and providing the web server the traffic data, wherein the traffic data includes relative signal strength values, location data, and quality of signal data, and wherein the web server locates the mobile communication device, calculates a velocity of the mobile communication device at a first time interval and a second time interval, maps a geographic location of the mobile device to a street map using a database of cell locations, and counts a number of mobile communication devices passing a point during a certain time period.

17. The computer-readable medium of claim 16 having stored thereon additional instructions, said additional instructions when executed by a computer for receiving a request, cause said computer to further perform:

receiving a markup language document, wherein the document contains instructions; and executing the instructions by a Web browser running on the device.

18. The computer-readable medium of claim 16 having stored thereon additional instructions, said additional instructions when executed by a computer for providing traffic data, cause said computer to further perform:

generating a markup language document by a browser running on the device; and transmitting the document to the web server, wherein the document contains the traffic data.

* * * * *